United States Patent
Ciou et al.

(10) Patent No.: US 8,776,607 B2
(45) Date of Patent: Jul. 15, 2014

(54) ELECTRICAL PROPERTY MEASURING APPARATUS FOR PRESSURE SENSOR AND MEASURING METHOD THEREOF

(75) Inventors: Jyun-Kai Ciou, Changhua County (TW); Yan-Rung Lin, Hsinchu (TW); Chang-Ho Liou, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 237 days.

(21) Appl. No.: 13/423,294

(22) Filed: Mar. 19, 2012

(65) Prior Publication Data

US 2013/0167651 A1 Jul. 4, 2013

(30) Foreign Application Priority Data

Dec. 30, 2011 (TW) .............................. 100149866 A

(51) Int. Cl.
*G01L 9/00* (2006.01)
(52) U.S. Cl.
USPC ........................................................... 73/753
(58) Field of Classification Search
USPC .................................................... 73/700–756
See application file for complete search history.

(56) References Cited

U.S. PATENT DOCUMENTS

| | | | |
|---|---|---|---|
| 5,293,770 A | 3/1994 | Hansen et al. | |
| 6,652,740 B2 | 11/2003 | Schoess | |
| 6,993,954 B1 | 2/2006 | George et al. | |
| 2005/0121826 A1* | 6/2005 | Hajizadeh et al. | 264/239 |
| 2005/0258037 A1* | 11/2005 | Hajizadeh et al. | 204/403.14 |
| 2007/0219496 A1 | 9/2007 | Kamen et al. | |
| 2011/0074017 A1 | 3/2011 | Morifuji et al. | |
| 2013/0209277 A1* | 8/2013 | Locke et al. | 417/53 |
| 2013/0209281 A1* | 8/2013 | Locke et al. | 417/63 |
| 2013/0223979 A1* | 8/2013 | Locke et al. | 415/1 |
| 2013/0228018 A1* | 9/2013 | Mouchel La Fosse et al. | 73/753 |
| 2013/0238129 A1* | 9/2013 | Rose et al. | 700/258 |

FOREIGN PATENT DOCUMENTS

| | | |
|---|---|---|
| CN | 101008602 | 8/2007 |
| CN | 101835422 | 9/2010 |
| TW | 277702 | 6/1996 |
| TW | 201001631 | 1/2010 |
| TW | 201027054 | 7/2010 |

OTHER PUBLICATIONS

Chen et al., "Detection of the Coefficient of Friction and Slippage Based on Flexible Tactile Sensor with Structural Electrodes Array", Master's Dissertation, Department of Mechanical Engineering of Southern Taiwan University, Jul. 2009, pp. 1-68.

(Continued)

*Primary Examiner* — Andre Allen
(74) *Attorney, Agent, or Firm* — Jianq Chyun IP Office

(57) ABSTRACT

An electrical property measuring apparatus for pressure sensor includes a first plate, a second plate, an object to be measured, an electrical property measuring unit used for measuring the electrical properties of the object, and a fluid supplying system. The second plate is opened or closed relative to the first plate. The object is disposed between the first plate and the second plate. The fluid supplying system connects to a space formed by the first plate and a pressed surface or a space formed by the second plate and a pressed surface. The fluid supplying system provides a fluid to the space such that the fluid presses on the object and the electrical property measuring unit measures the electrical properties of the object. A method of measuring electrical property for pressure sensor is also provided.

35 Claims, 12 Drawing Sheets

(56) References Cited

OTHER PUBLICATIONS

Hu et al., "The Study of a Novel Flexible Pressure/Tactile Sensors Array", Master's Dissertation, Department of Power Mechanical Engineering (PME) of National Tsing Hua University (NTHU), Jul. 2007, pp. 1-105.

Kuo et al, "Design, Fabrication, and Signal Processing of an Array of Micro-Prressure Sensors", Master's Dissertation, Department of Mechanical Engineering of National Cheng Kung University, Jan. 2003, pp. 1-79.

"Office Action of Taiwan Counterpart Application", issued on Apr. 9, 2014, p1-p3.

* cited by examiner

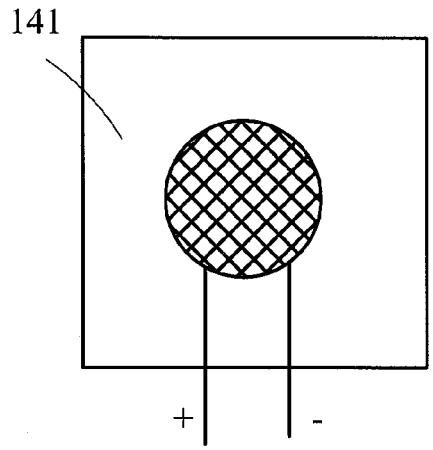
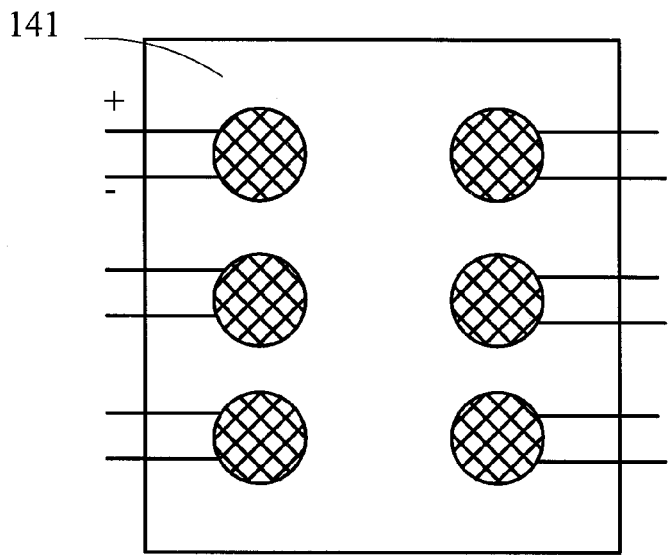
FIG. 1C    FIG. 1D
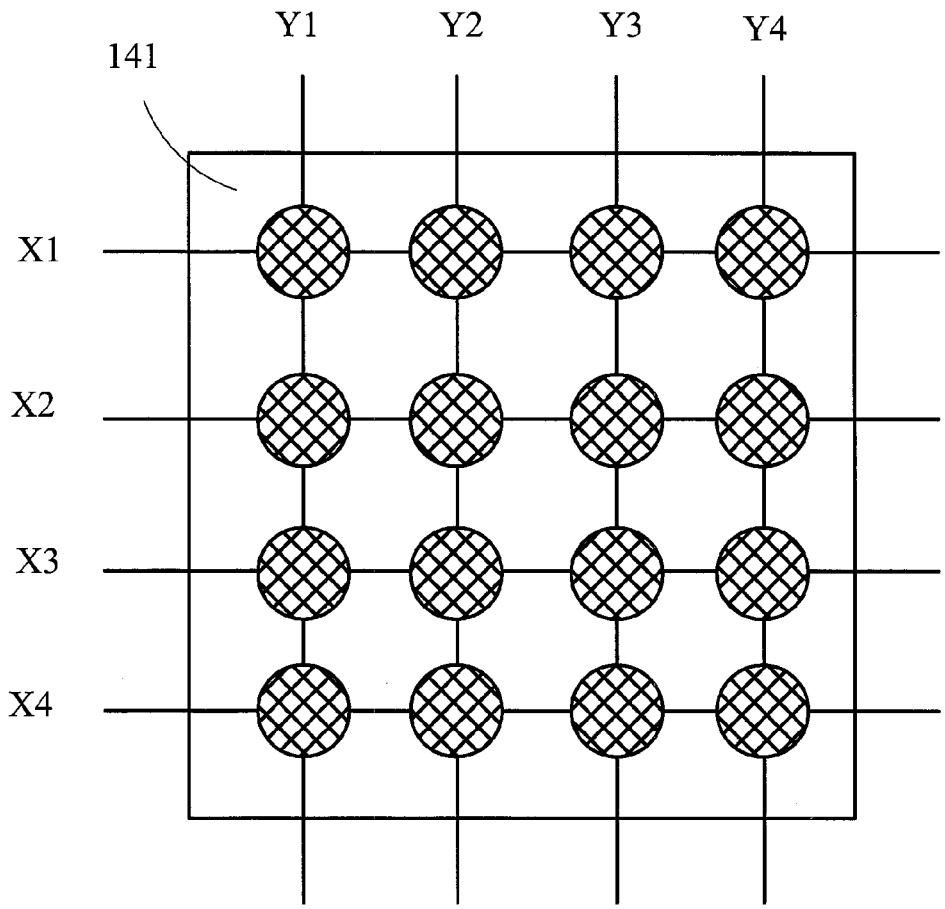
FIG. 1E

ELECTRICAL PROPERTY MEASURING APPARATUS FOR PRESSURE SENSOR AND MEASURING METHOD THEREOF

CROSS-REFERENCE TO RELATED APPLICATION

This application claims the priority benefit of Taiwan application serial no. 100149866, filed Dec. 30, 2011. The entirety of the above-mentioned patent application is hereby incorporated by reference herein and made a part of this specification.

TECHNICAL FIELD

The disclosure relates to an electrical property measuring apparatus and a method thereof, and more particularly to an electrical property measuring apparatus and method for pressure sensor.

BACKGROUND

In recent technology of calibrating pressure sensors with a large area, a pressing unit having a rigid structure is often used to directly press on the sensor having a plurality of sensing units, wherein the uniformity of the pressing force of the pressing unit depends on the planarity of the contacting area between the pressing unit and the pressure sensor. As for the rigid structure, the larger the contacting area, it is more difficult to obtain a good planarity, i.e., the worse the planarity would become.

Accordingly, the pressing unit composed of rigid structure needs a very high fabricating cost to have a good planarity, otherwise it would lead to a bad uniformity of pressure due to the bad planarity during pressing process. Both of the ways mentioned above cannot effectively solve the issue of calibrating pressure sensors having a large area.

SUMMARY

The disclosure provides an electrical property measuring apparatus for pressure sensor including a first plate and a second plate being opened or closed relative to each other; an object to be measured disposed between the first plate and the second plate; an electrical property measuring unit for measuring an electrical property signal of the object; and a fluid supplying system connected to a space formed by the first plate or the second plate with a pressed surface, the fluid supplying system provides a fluid to the space so that the fluid presses on the object and the electrical property measuring unit measures the electrical property signal of the object.

The disclosure further provides a method of measuring electrical property for pressure sensor including providing a first plate and a second plate; providing an object to be measured disposed between the first plate and the second plate; closing the first plate and the second plate so that a space is formed between a pressed surface and the first plate, or a space is formed between a pressed surface and the second plate; providing a fluid to the space through a fluid supplying system; detecting a fluid pressure variation within the space with a fluid pressure detector; pressing on the object with the fluid; and measuring an electrical property signal transmitted by the object due to a fluid pressure.

In order to make the aforementioned and other features and advantages of the disclosure more comprehensible, embodiments accompanying figures are described in detail below.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

FIG. 1C to FIG. 1E schematically illustrates the embodiments of the pressure sensor of the disclosure.

DETAILED DESCRIPTION OF EMBODIMENTS

Figure 1A:
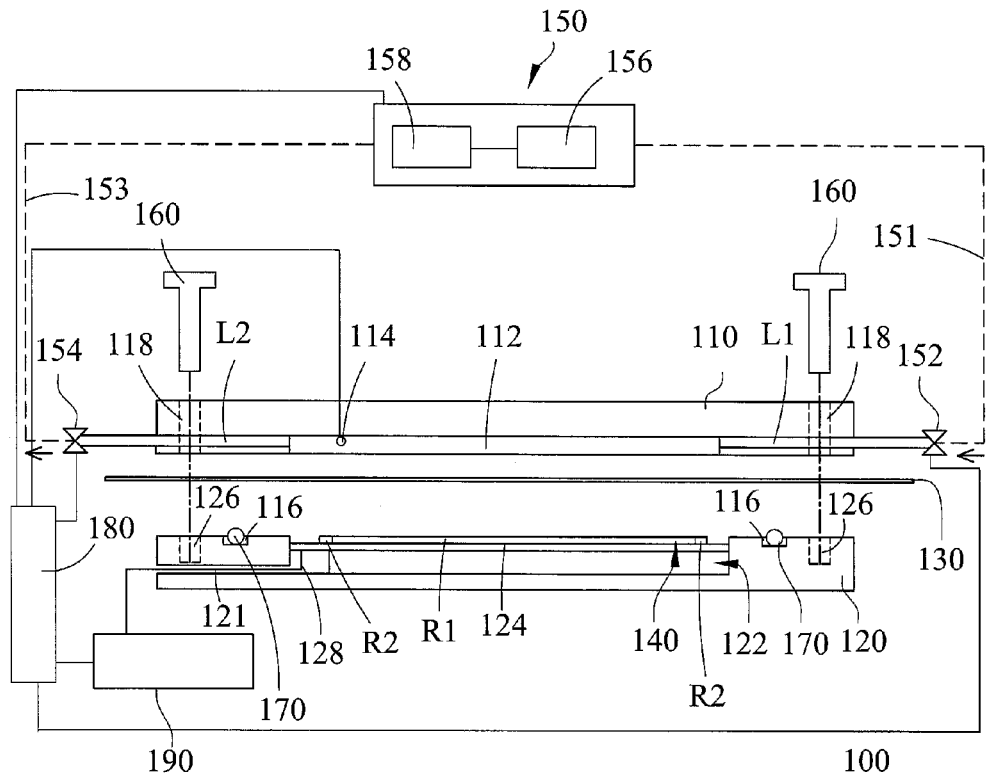
FIG. 1A is a schematic view of an electrical property measuring apparatus for pressure sensor according to an embodiment of the disclosure.

Descriptions of the disclosure are given with reference to the embodiments illustrated with accompanied drawings wherein same or similar parts are denoted with same reference numerals. However, it is not limited thereto, and the same parts can also be denoted with different numerals.

The disclosure provides an electrical property measuring apparatus for pressure sensor and a method thereof to measure electrical property of pressure sensors having different area.

Figure 1B:
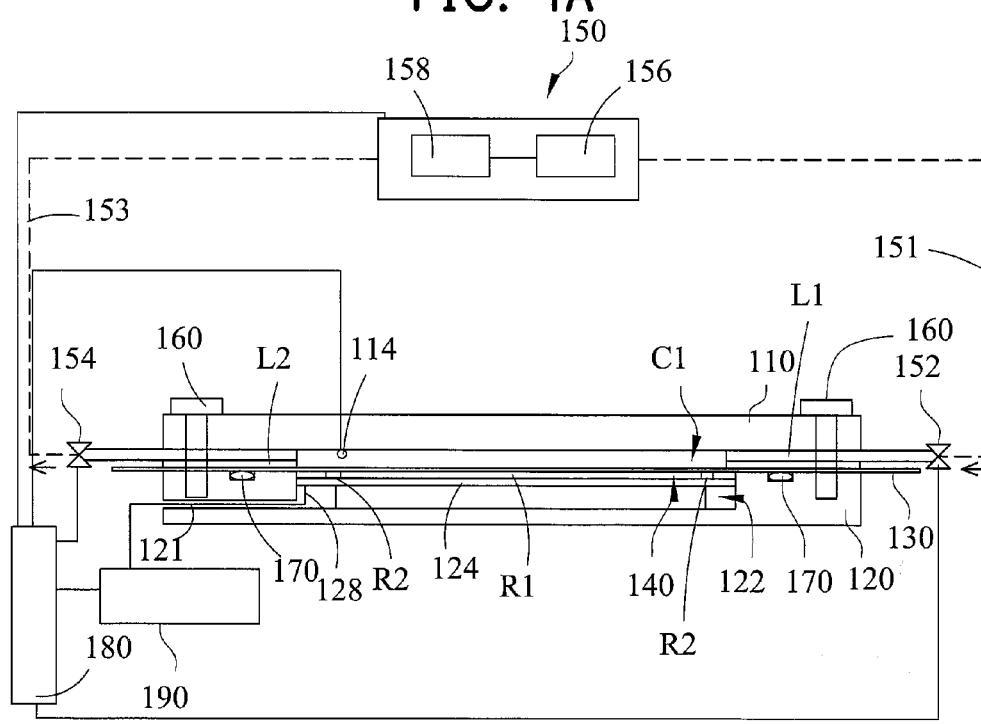
FIG. 1B schematically shows another status of FIG. 1A.

FIG. 1A is a schematic view of an electrical property measuring apparatus for pressure sensor according to an embodiment of the disclosure. FIG. 1B schematically shows another status of FIG. 1A. Referring to FIG. 1A and FIG. 1B together, the electrical property measuring apparatus 100 for pressure sensor includes a first plate 110, a second plate 120, a flexible element 130, an object 140 to be measured, a fluid supplying system 150, a fastening assembly 160, a sealing element 170, a controller 180 and an electrical property measuring unit 190. The second plate 120 is a fixed supporting platform, for example, and the object 140 is disposed on the second plate 120. Wherein the object 140 includes one pressure sensor, a plurality of pressure sensors, or a plurality of pressure sensor array arranged on a flexible element, wherein the plurality of pressure sensors are formed by being connected to each other and disposing on the flexible element. However, it should not be construed as limited to the embodiment set forth herein.

The first plate 110 is able to be opened or closed relative to the second plate 120. When the first plate 110 and the second plate 120 are closed, the flexible element 130 clipped between the first plate 110 and the second plate 120, so that a space C1 is formed by the first plate 110 and a pressed surface, or a space C1 is formed by the second plate 120 and a pressed surface, such that the space C1 separates the object 140 from a fluid. Wherein the fluid can be a gas or a liquid.

In one embodiment of the disclosure, the pressed surface can be the surface of the flexible element 130.

In one embodiment of the disclosure, the surface of the flexible element 130 can be larger than the surface of the space C1. And the surface of the object 140 is smaller than the surface of the space C1.

The fluid supplying system 150 can be connected to the space C1 through a first piping 151 and a second piping 153, and an inlet valve 152 is disposed at the first piping 151 located at an inlet of the space C1, and an outlet valve 154 is disposed at the second piping 153 located at an outlet of the space C1, so that the controller 180 controls the fluid supplying system 150 to output the fluid to enter the space C1 and to drain the fluid to leave the space C1. In the embodiment, a gas is used as a medium of the fluid for entering or leaving the space C1 in the electrical property measuring apparatus 100 for pressure sensor, and thus the related components and structures are designed according to the property of gas, but the disclosure is not limited thereto. The structures of the electrical property measuring apparatus for pressure sensor can be correspondingly designed according to actual requirements by using the fluid with different properties. Wherein the space C1 is a hermetically sealed space for a fluid passing through.

The first plate 110 has a first flow path L1 and a second flow path L2, wherein the first flow path L1 and a second flow path L2 are disposed at two sides of the first plate 110 respectively. The first flow path L1 is connected to the inlet valve 152 and the second flow path L2 is connected to the outlet valve 154, so as to control the fluid to enter the space C1 through the inlet valve 152 and the first flow path L1 and leave the space C1 through the outlet valve 154 and the second flow path L2. The principle of the motion is described later.

In one embodiment, a first recess 112 is formed on the first plate 110, and the second plate 120 can be a supporting platform. In another embodiment, a second recess 122 is formed on the second plate 120, and the first plate 110 can be a supporting platform. Or further, in another embodiment, a first recess 112 and a second recess 122 are corresponding formed on the first plate 110 and the second plate 120 respectively. That is to say, a supporting plate 124 is disposed on the first recess 112 or the second recess 122 to support the object 140. In the embodiment, the first recess 112 is formed on the first plate 110, and the second recess 122 is formed on the second plate 120, and the supporting plate 124 is disposed on the second recess 122 to make a supporting platform for supporting the object 140. However, the spirit of the disclosure should not be construed as limited to the embodiment set forth herein.

When the first plate 110 and the second plate 120 are closed, the fastening assembly 160 can be used for fixing the first plate 110 to the second plate 120. The fastening assembly 160 can be screws and nuts, bolts and nuts, or the internal threads of the second plate 120 being screwed with bolts or screws, or any other suitable elements. In the embodiment, bolts or screws pass through the holes 118 of the first plate 110 and are fastened to the threads 126 of the second plate 120. However, the spirit of the disclosure should not be construed as limited to the embodiment set forth herein.

In order to hermetically seal and prevent leakage of the fluid, an annular trench 116 is disposed at the peripheral of the first recess 112 or the second recess 122. The sealing element 170 is configured in the annular trench 116, so that when the first plate 110 and the second plate 120 are closed the sealing element 170 can act as a damper and enhance the sealing effect. The sealing element 170 can be a rubber, a polymer or other annular thin element in equivalent materials. The first recess 112, the second recess 122, the annular trench 116 and the sealing element 170 can be designed to have the same geometrical shapes, e.g., rectangular, circular, square or the like. The cross-sectional of the sealing element 170 can be circular, rectangular or the like. Wherein, the area of the flexible element 130 is larger than the area of the sealing element 170.

The flexible element 130 can be a thin film having flexibility, elasticity, gas barrier property or the material of a combination thereof. For example, the thin film can be made of a polycarbonate (PC) material. This material is one of the materials described in the embodiment, and the disclosure should not be construed as limited to this material and any other suitable materials having the same or similar property are still within the scope of the disclosure.

The fluid supplying system 150 includes a pump 156 and a fluid tank 158. The fluid in the fluid tank 158 is output by the pump 156 and transmitted into the space C1 through the first piping 151, the first flow path L1 and the inlet valve 152. And the fluid in the space C1 is then returned into the fluid tank 158 through the second flow path L2, the outlet valve 154 and the second piping 153. Wherein the first flow path L1 and the second flow path L2 can be one or more flow paths which are respectively connected to the first piping 151 and the second piping 153, and the disclosure is not limited thereto. The fluid used in the embodiment is a gas, for example. In one embodiment, the gas can be voided to the external environment through the outlet valve 154, and the gas is unnecessary to return into the fluid tank 158, and the disclosure is not limited thereto.

A fluid pressure detector 114 is disposed in the space C1 for detecting a fluid pressure variation within the space C1. The object 140 can be classified into a measuring area R1 and a wiring connecting area R2 surrounding the measuring area R1. The pressure sensor to be measured of the object 140 is located in the measuring area R1. The object 140 includes one or a plurality of pressure sensors or a pressure sensor array arranged and electrically connected to the wiring connecting area R2 respectively, and the wiring connecting area R2 is connected to one or a plurality of wires 128. In one embodiment, when the first plate 110 and the second plate 120 are closed, the measuring area R1 and the wiring connecting area R2 are located within the space C1, and the fluid may exert a pressure to the object 140 located in the measuring area R1 through the flexible element 130. Then, the electrical property signal generated by the object 140 due to the pressure is transmitted to the wiring connecting area R2 and then to the electrical property measuring unit 190 through the wires 128. Accordingly, the wires 128 can be connected to the hole 121 of the second plate 120, and since the flexible element 130 separates the fluid, the bother of fluid leaking out of the space C1 can be avoided. In other words, a structure design of the pressing terminal and the measuring terminal being independent is used in this embodiment.

Additionally, the wires 128 located in the wiring connecting area R2 are correspondingly and electrically connected to the object 140. Thus, when the electrical property of one of the pressure sensors of the object 140 is measured, the rest of the pressure sensors which are not measured are electrically grounded. This is one of the exemplary embodiments, but the spirit of the disclosure should not be construed as limited to the embodiment set forth herein.

An electrical connecting way of one pressure sensor or a plurality of pressure sensors are described in the following. FIG. 1C to FIG. 1E schematically illustrates the embodiments of the pressure sensor of the disclosure. As shown in FIG. 1C, if the object 140 is one pressure sensor being measured, two wires, one positive and one negative, can be coupled to the electrical property measuring unit 190.

As shown in FIG. 1D, if the object 140 is many pressure sensors being measured, each of the pressures can have two wires, one positive and one negative, to be coupled to the electrical property measuring unit 190.

As shown in FIG. 1E, if the object 140 is a pressure sensor array being measured, the electrical property measuring unit 190 can be set to have a certain pressure sensor to be measured. For example, if the pressure sensor at X1Y1 position is to be measured, then the rest of the pressure sensors are electrically grounded, which means that one of the X1 or Y1 wire is selected to be connected to the ground and the other is connected to the electrical property measuring unit 190, and all of the X2, X3, X4, Y2, Y3, Y4 are connected to the ground.

In one embodiment, one or more pressure sensors can be disposed on a flexible thin film 141.

In one embodiment, a hole 121 can be disposed at the second plate 120, and an end of each of the wires 128 can pass through the hole 121 and connected to the wiring connecting area R2, and the other end of the wires can be connected to the electrical property measuring unit 190.

In one embodiment, the wires 128 can also be directly connected from the position between the first plate 110 and the second plate 120 to the electrical property measuring unit 190.

The electrical property measuring unit 190 of the disclosure can be a microprocessor capable of memorizing and calculating data of various electrical properties and using a predetermined pressure value to calibrate and adjust the pressure sensor of the object with a good reliability and accuracy.

The controller 180 of the disclosure is electrically connected to the fluid supplying system 150, the fluid pressure detector 114, the inlet valve 152, the outlet valve 154 and the electrical property measuring unit 190 respectively, and controls the procedures of inlet and outlet of the fluid from the space C1 through the above mentioned components and electrical property measurements, and the details are described later.

Figure 2:
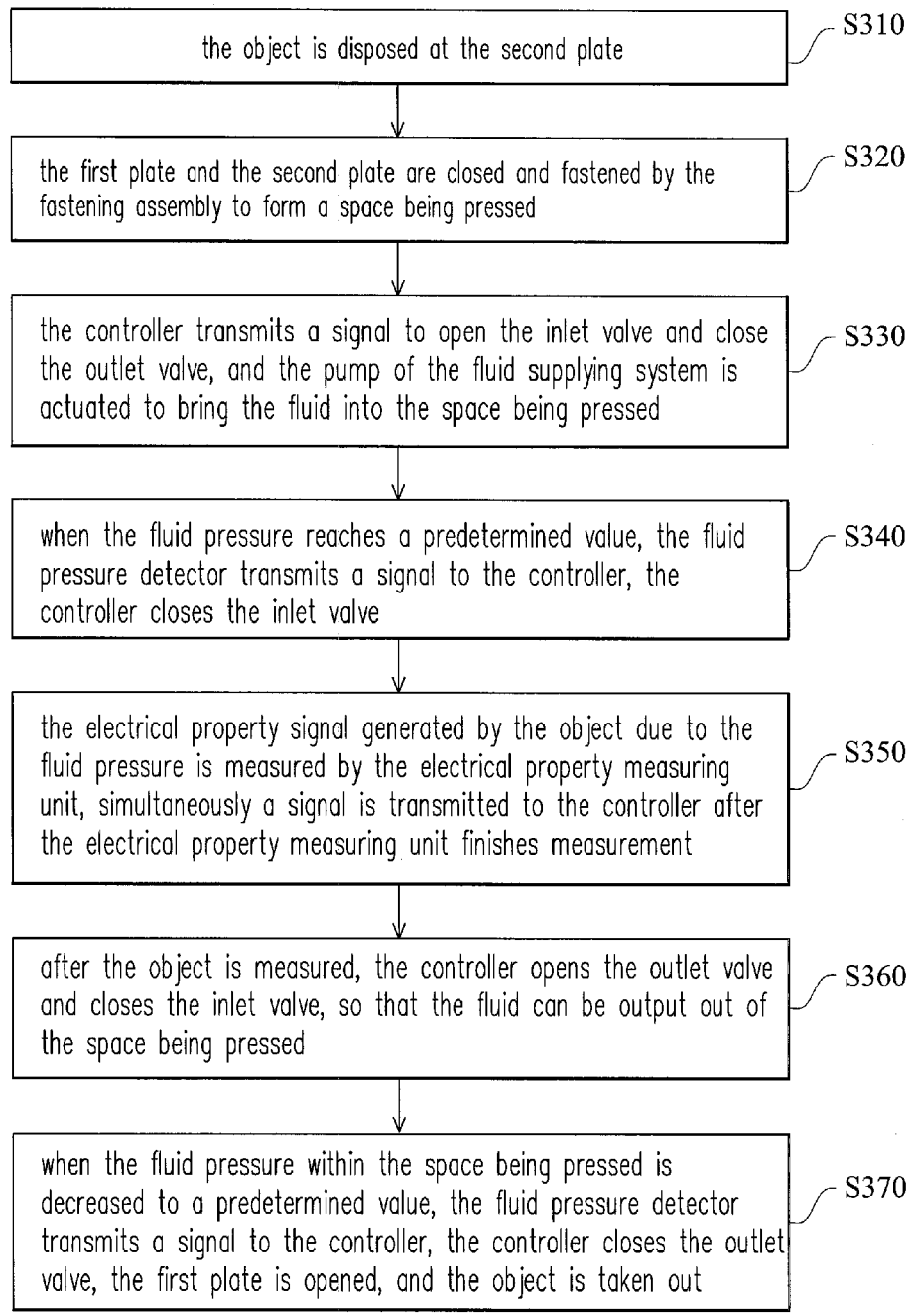
FIG. 2 is a flow chart illustrating the method of electrical property measuring for pressure sensor of FIG. 1A and FIG. 1B.

FIG. 2 is a flow chart illustrating the method of electrical property measuring for pressure sensor of FIG. 1A and FIG. 1B. Referring to FIG. 1A, FIG. 1B and FIG. 2 together, a gas is used as the fluid in the embodiment. First, in step S310, the object 140 is disposed on the supporting platform of the second plate 120. In step S320, the first plate 110 and the second plate 120 are closed, the first plate 110 and the second plate 120 are fastened by using the fastening assembly 160, so that the first plate 110 and a pressed surface form a space C1, (or the second plate 120 and a pressed surface form a space C1), and the object 140 is located in the space C1, and the flexible element 130 is clipped between the first plate 110 and the second plate 120 and the object 140 is separated from a fluid by the flexible element 130. The wires 128 are electrically connected to the object 140 and the electrical property measuring unit 190 respectively. And then, in step S330, the controller 180 is operated to output a signal to open the inlet valve 152 and to close the outlet valve 154, and the pump 156 of the fluid supplying system 150 is actuated to bring the fluid in the fluid tank 158 into the space C1 through the inlet valve 152 and the first flow path L1. In step S340, when the fluid pressure in the space C1 reaches a predetermined value, the fluid pressure detector 114 within the space C1 may transmit a signal to the controller 180, at this time the controller 180 closes the inlet valve 152 and the pump 156 to stop providing the fluid (or the pump 156 may not be closed), and the electrical property measuring unit 190 is actuated for measuring the electrical property of the object 140. In step S350, when the electrical property measuring unit 190 is actuated and the electrical signal variation, e.g., change of resistance, voltage, current, capacitance, inductance or the like, generated by the object 140 due to the fluid pressure is measured, in order to obtain the electrical property of the object and then it is turned into the pressure sensing property to achieve the current pressure sensing property of the object 140. After the electrical property measuring unit 190 finishes the measurement, a signal is transmitted to the controller 180.

And then, in step S360, after the electrical property of the object 140 is measured and the controller 180 receives the signal that the electrical property measuring unit 190 finishes the measurement, the controller 180 may close the inlet valve 152 and the pump 156 first, and the outlet valve 154 is opened, so that the fluid is output from the space C1 and brought into the fluid tank 158 from the outlet valve 154 through the second flow path L2. In one embodiment, the fluid tank 158 is not necessary, and the gas can also be inlet or outlet in the circumstance through the pump 156 to obtain the same function. Finally, in step S370, when the fluid pressure in the space C1 is decreased to a predetermined value (e.g., equal to the pressure of the external environment), the fluid pressure detector 114 in the space C1 may send a signal to the controller 180, and then after the controller 180 closes the outlet valve 154 and the pressure within the space C1 is released, the first plate 110 can be opened and the object 140 can be taken out. In the step of another embodiment, the controller 180 may not close the outlet valve 154 and the gas can be directly output to the external environment. Since when the pressure within the space C1 is equal to the external pressure, the first plate 110 and the second plate 120 can be conveniently opened. Wherein the fluid pressure detector 114 has a display to show the pressure values.

It has to be noted that, the electrical signal generated by the object 140 due to the fluid pressure includes at least one of the resistance, voltage, current, capacitance, inductance or a combination thereof, after measured by the electrical property measuring unit 190 and the signals of the object 140 are further calibrated so that the pressure sensor of the object 140 can have a good reliability and accuracy.

In the embodiment, since the fluid pressure in the space C1 is detected by means of the object 140 contacting with the flexible element 130, the object 140 has not to be in the sealed space C1, i.e., the object 140 has not to be disposed in the fluid. Accordingly, the condition of the wires 128 having to be pulled directly out of the fluid within the space C1 can be avoided. And thus, the electrical property measuring apparatus 100 of the embodiment can effectively reduce the difficulty in pressure sensor measurement. In other words, the pressing terminal (i.e., the fluid inletting the space C1) and the measuring terminal (i.e., the electrical property measuring unit 190 and the object 140) are designed to be independent, and thus the fluid leakage during measurement can be prevented.

Figure 3A:
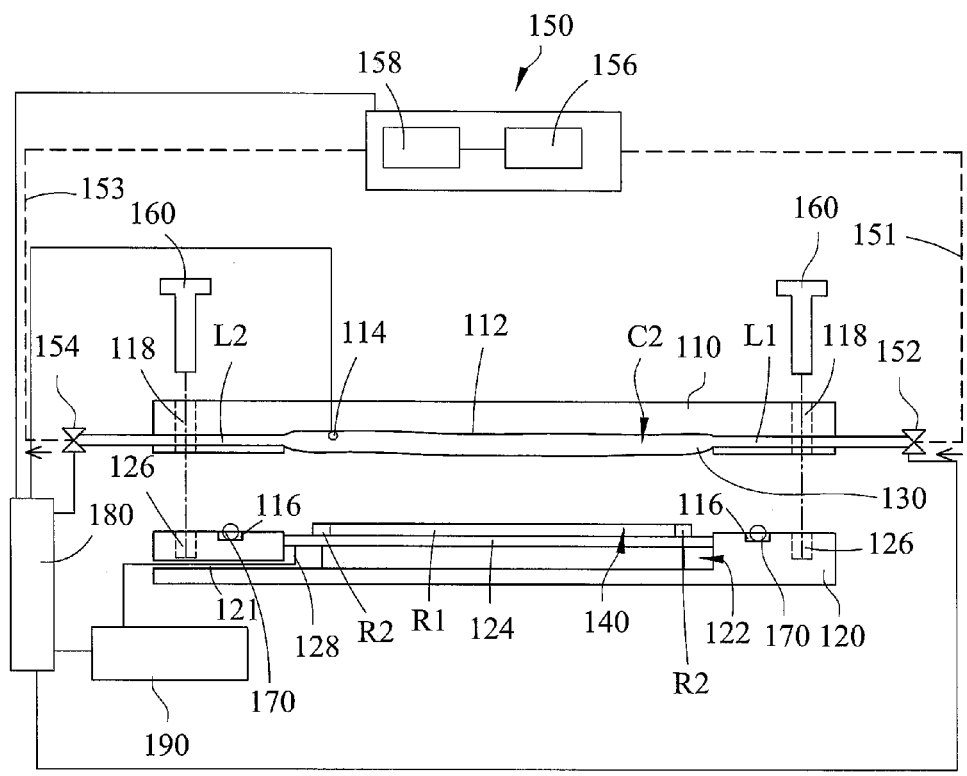
FIG. 3A and FIG. 3B are schematic views respectively illustrating an electrical property measuring apparatus in different statuses according to another embodiment of the disclosure.
Figure 3B:
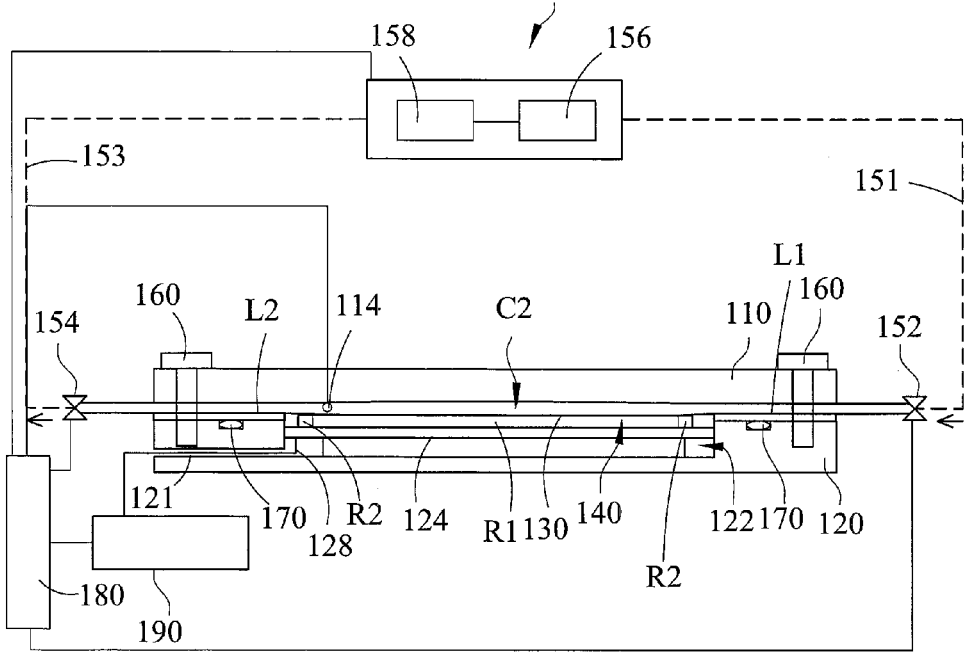

FIG. 3A and FIG. 3B are schematic views respectively illustrating an electrical property measuring apparatus in different statuses according to another embodiment of the disclosure. Referring to FIG. 3A and FIG. 3B together, the structures are mainly the same to FIG. 1A and FIG. 1B, and the difference from the above mentioned embodiment is illustrated as follows: In the electrical property measuring apparatus 100 of the embodiment, the flexible element 130 can be a bag disposed within the first recess 112 of the first plate 110 and connected to the fluid supplying system 150 by respectively passing through the first flow path L1 and the second flow path L2 through the inlet valve 152 and the outlet valve 154, and thus when the inlet valve 152 and the outlet valve 154 are closed the internal space of the bag may become a bag space C2. When the fluid supplying system 150 transmits the fluid into the bag, it leads to deformation and inflation of the bag, so as to press on the object 140 to achieve the effect similar to the above mentioned embodiment of the fluid pressure within the bag space C2 of the object 140 being detected by the thin film.

When the first plate 110 and the second plate 120 are closed, so that the first plate 110 or the second plate 120 and the pressed surface form a space C1 and separates the object 140 from a fluid.

In one embodiment, the pressed surface can be the internal surface of the bag.

The rest of the components are similar in structures, and it is not repeated thereto.

Figure 4A:
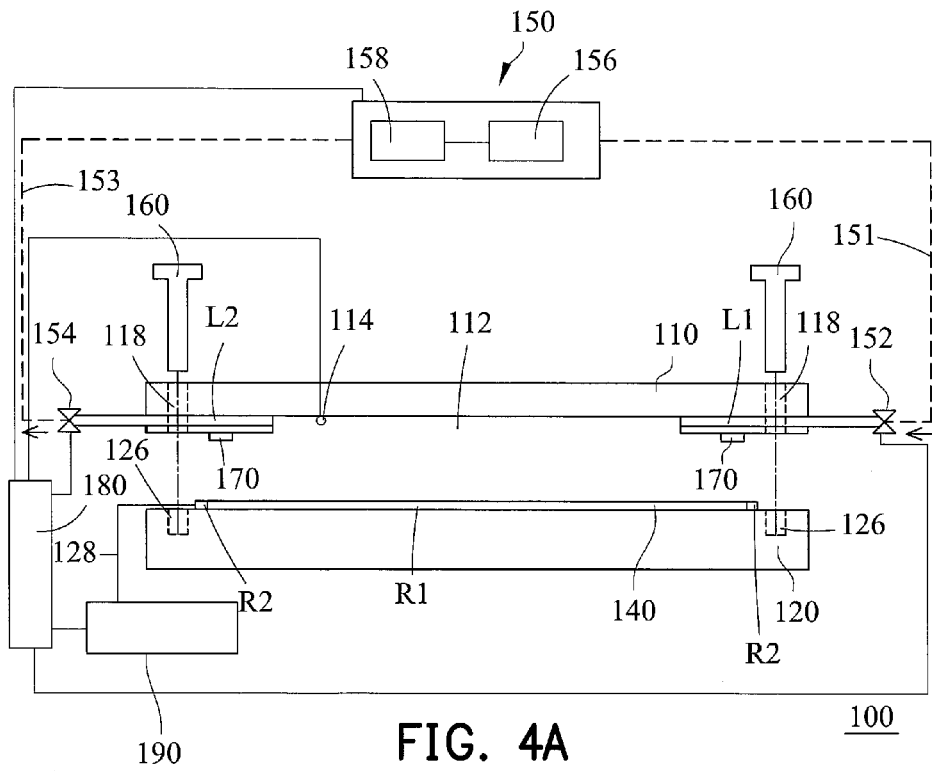
FIG. 4A and FIG. 4B are schematic views respectively illustrating an electrical property measuring apparatus in different statuses according to another embodiment of the disclosure.
Figure 4B:
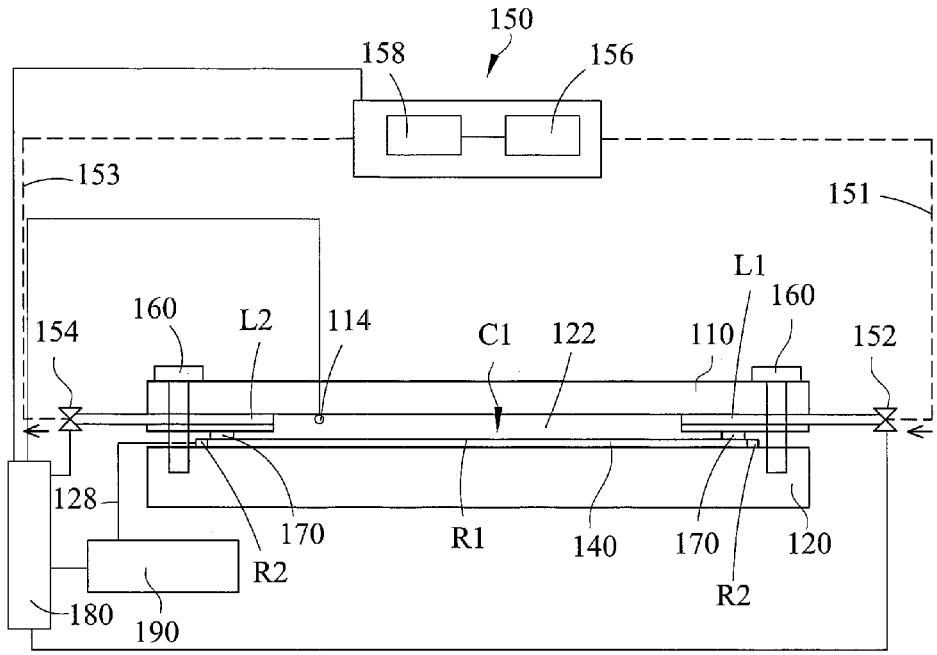

FIG. 4A and FIG. 4B are schematic views respectively illustrating an electrical property measuring apparatus in different statuses according to another embodiment of the disclosure. Referring to FIG. 4A and FIG. 4B together, the structures are mainly similar to the FIG. 1A and FIG. 1B, and the difference from the above mentioned embodiment is illustrated as follows: In the electrical property measuring apparatus 100 of the embodiment, the object 140 is disposed on the support platform of the second plate 120, i.e., the second plate 120 has designed with no recess disposed thereon, and the first plate 110 is disposed a first recess 112 thereon. No flexible element 130 is designed in the present embodiment. The sealing element 170 disposed at the peripheral of the first recess 112 of the first plate 110 can be, for example, an O-ring. When the first plate 110 and the second plate 120 are closed, the sealing element 170 is located between the first plate 110 and the second plate 120, and located at the peripheral of the space C1, and the object 140 is clipped by the sealing element 170. In other words, the orthogonal projection area of the object 140 onto the second plate 120 is larger than the orthogonal projection area of the sealing element 170 onto the second plate 120 in the embodiment, i.e., the area of the object 140 is larger than the area of the sealing element 170. When the first plate 110 and the second plate 120 are closed, the sealing element 170 may clip the object 140 so that a portion of the object 140 is located outside the sealing element 170. Wherein the area of the object 140 is greater than the area of the space C1.

The object 140 can be classified into a measuring area R1 and a wiring connecting area R2 surrounding the measuring area R1. The object 140 includes one or a plurality of pressure sensors or pressure sensor array electrically connected to the wiring connecting area R2 respectively, and the wiring connecting area R2 is connected to one or a plurality of wires 128. In one embodiment, when the first plate 110 and the second plate 120 are closed, the measuring area R1 is located in the range of sealing element 170, and the wiring connecting area R2 is located outside the sealing element 170, and the fluid may exert a pressure to the object 140 located in the measuring area R1. Then, the electrical property signal generated by the object 140 due to the pressure is transmitted to the wiring connecting area R2 and then to the electrical property measuring unit 190 through the wires 128. Accordingly, the condition of the wires 128 having to be pulled directly out of the fluid within the space C1 and the fluid leakage out of the space C1 can be avoided. In other words, a structure design of the pressing terminal and the measuring terminal being independent is used in the present embodiment.

Additionally, the wires 128 located in the wiring connecting area R2 are correspondingly and electrically connected to the object 140. Thus, when the electrical property of one of the pressure sensors of the object 140 is measured, the rest of the pressure sensors which are not measured are electrically grounded. The embodiment can be referred to FIG. 1C to FIG. 1E.

In addition, the connection between the wiring connecting area R2 and the electrical property measuring unit 190 is not limited in the disclosure. In the embodiment, when the first plate 110 and the second plate 120 are closed, since both the object 140 and the wires 128 are flexible so as to bear the closing pressure of the first plate 110 and the second plate 120 without affecting the function of the electrical connection, and the wires 128 are extended from the position between the first plate 110 and the second plate 120 and connected to the electrical property measuring unit 190.

In one embodiment, the pressed surface can be the surface of the object 140.

Figure 4C:
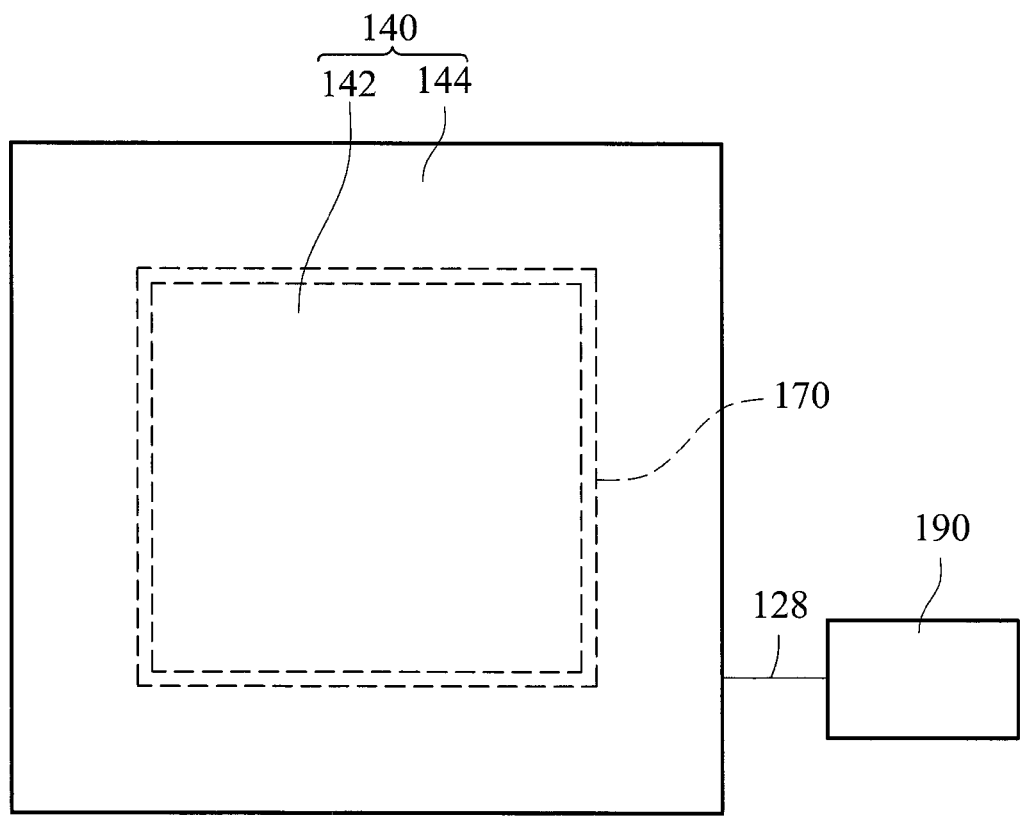
FIG. 4C is a schematic top view of the object located on the electrical property measuring apparatus of FIG. 4A.

FIG. 4C is a schematic top view of the object located on the electrical property measuring apparatus of FIG. 4A. Referring to FIG. 4A to FIG. 4C, in the embodiment, the object 140 has a measuring area 142 (the same as the measuring area R1 mentioned above) and a wire connecting area 144 (the same as the wiring connecting area R2), and the electrical property measuring unit 190 is electrically connected to the wire connecting area 144. In other words, since the space C1 of the embodiment is formed by the first plate 110 and the second plate 120, the fluid may press on a portion of the object 140, i.e., in the region of measuring area 142. The sealing element 170 defines and separates the measuring area 142 located in the center and the wire connecting area 144 surrounding the measuring area 142 by means of pressing on the object 140. When the electrical property measuring apparatus 100 of the embodiment is used, measuring area 142 and wire connecting area 144 with different areas can be designed according to required areas to be measured. And thus, the design and function of the pressing terminal and the measuring terminal of the electrical property measuring apparatus 100 being independent can be obtained.

The rest of the components are similar in structures, and it is not repeated thereto.

Figure 5A:
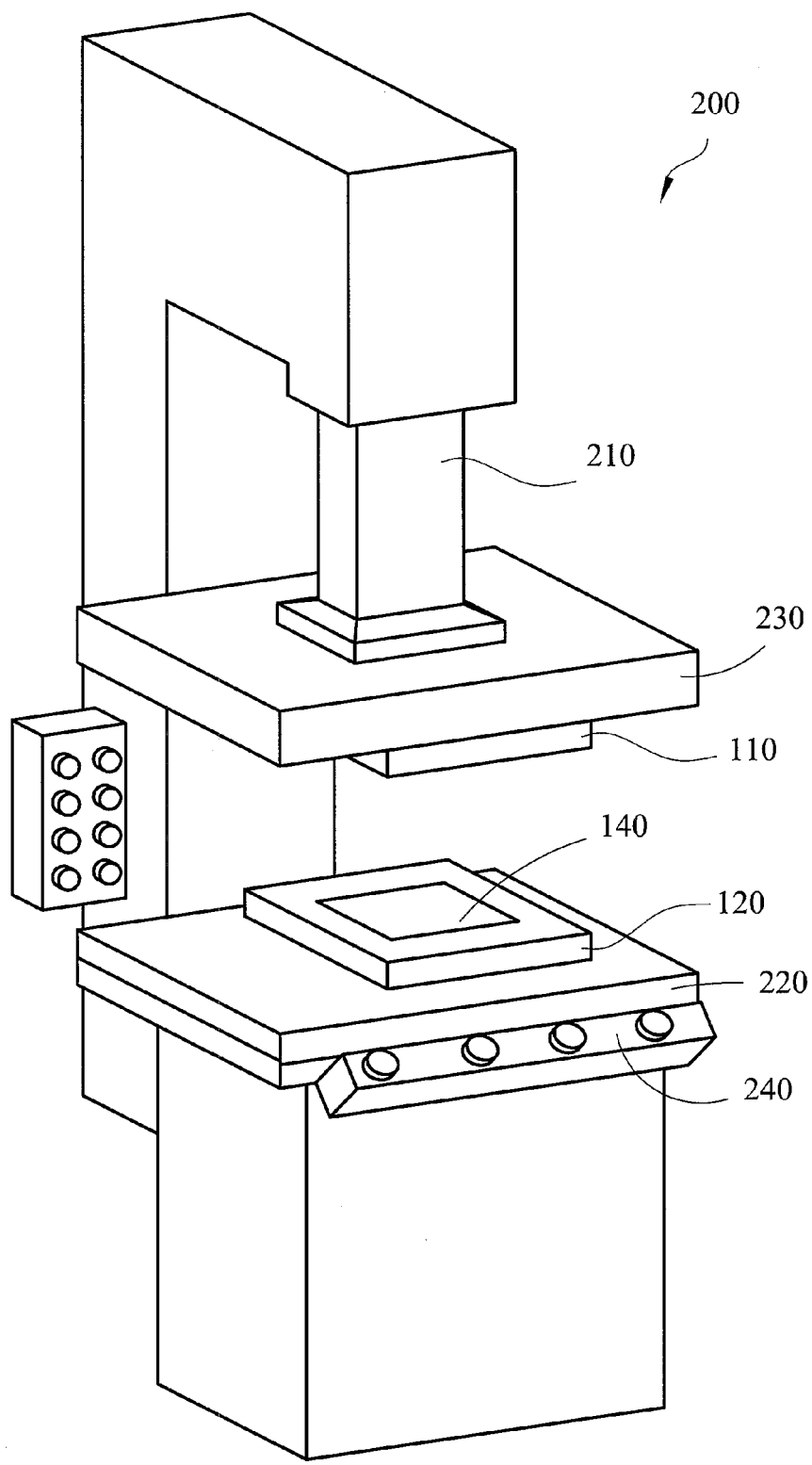
FIG. 5A is a schematic view of an electrical property measuring apparatus according to another embodiment of the disclosure.
Figure 5B:
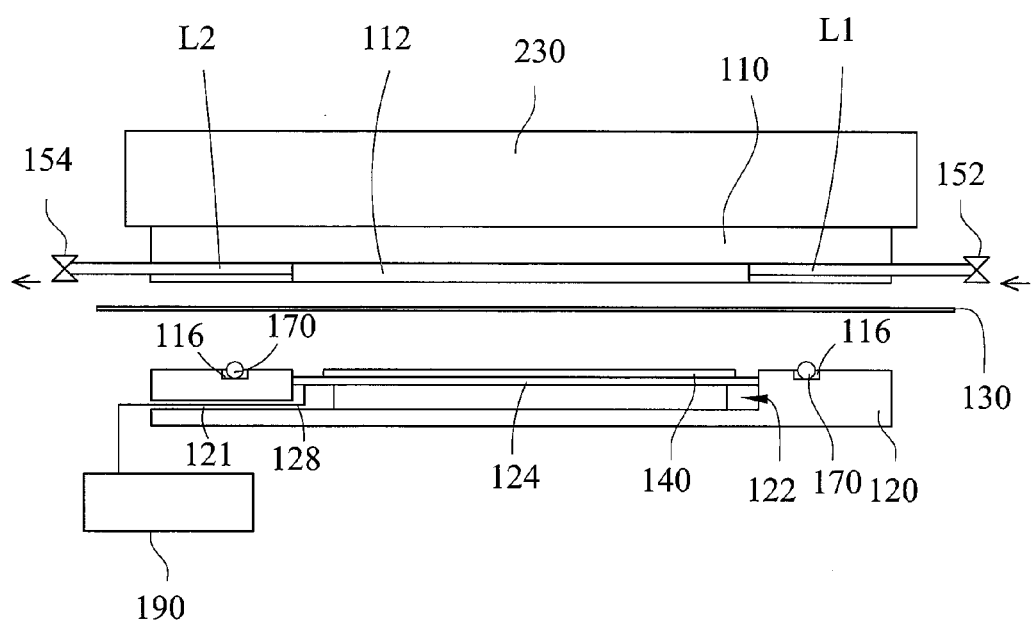
FIG. 5B is a partially side view of the electrical property measuring apparatus of FIG. 5A.

FIG. 5A is a schematic view of an electrical property measuring apparatus according to another embodiment of the disclosure. FIG. 5B is a partially side view of the electrical property measuring apparatus of FIG. 5A. Referring to FIG. 5A and FIG. 5B together, in the embodiment, a machine 200 is provided. The machine 200 includes a power module 210, a stage 220, a driver 230, and an operating station 240. The power module 210 includes an oil-pressure cylinder, a motor, a gear set, a circuit, a controller and so on. The power module 210 is connected to the driver 230 and the first plate 110 is connected to the bottom of the driver 230, and the second plate 120 is disposed on the stage 220, and the operating station 240 is disposed at a side of the stage 220. When the operating station 240 actuates the power module 210, and the power module 210 drives the driver 230 to drive the first plate 110 to move back and forth relative to the second plate 120, i.e., the opening or closing actions of the first plate 110 and the second plate 120. Thus, the power module 210 can actuate the first plate 110 and the second plate 120 to be closed so as to maintain the required pressing force of the space C1 located between the first plate 110 and the second plate 120, and this function is the same as the effect of the fastening assembly 160 of the previous mentioned embodiment. The structures of the first plate 110 and the second plate 120 of this embodiment is similar to the first embodiment mentioned above, and thus it is not repeated herein. Accordingly, any available technique which teaches the connecting structure for maintaining the first plate 110 and the second plate 120 to be opened or closed can be used in this disclosure.

The rest of the components are similar in structures, and it is not repeated thereto.

Figure 6A:
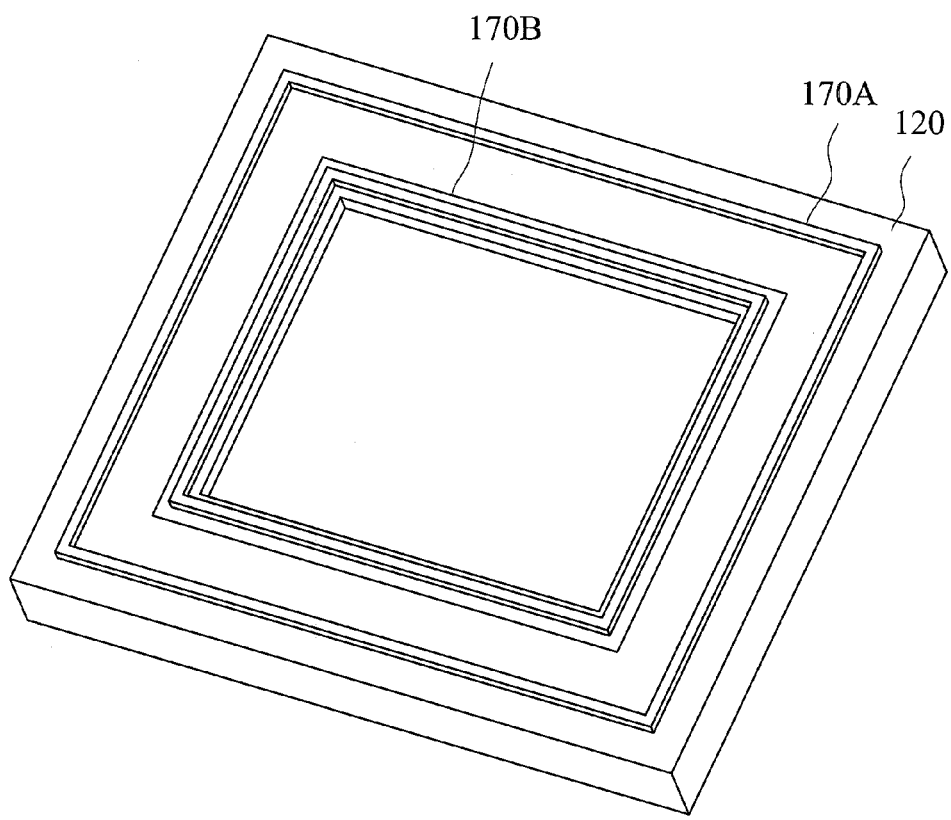
FIG. 6A is a partial schematic view of an electrical property measuring apparatus according to another embodiment of the disclosure.
Figure 6B:
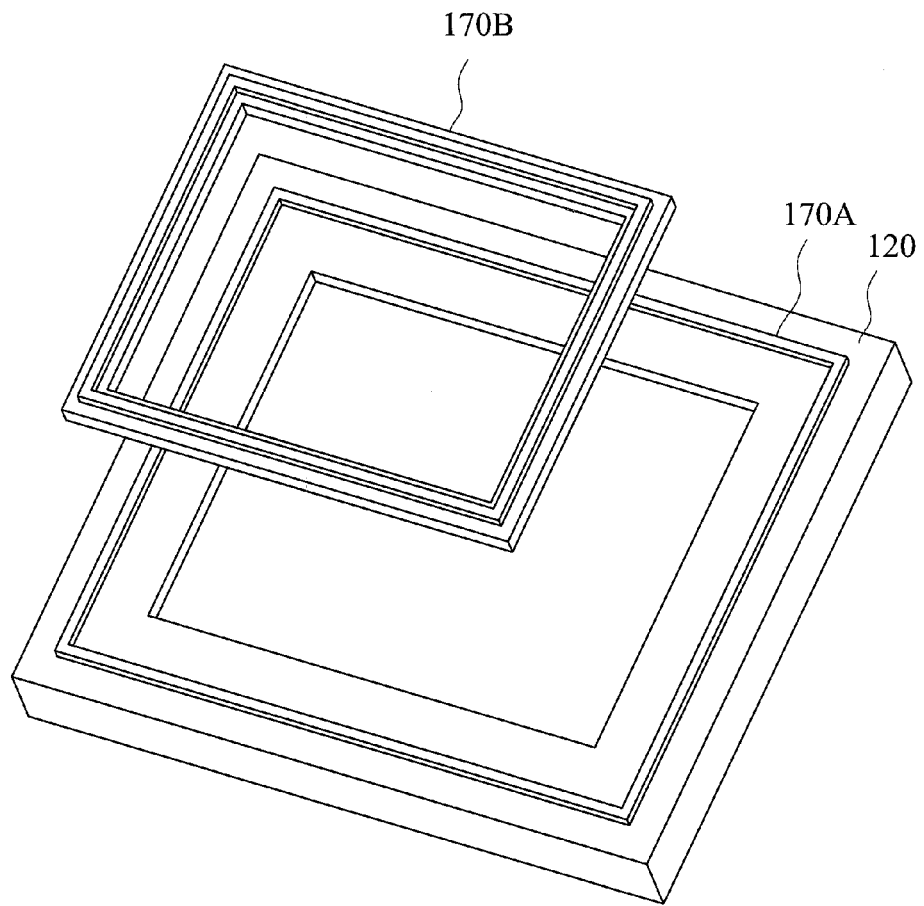
FIG. 6B is a perspective view of the second plate of FIG. 6A.
Figure 6C:
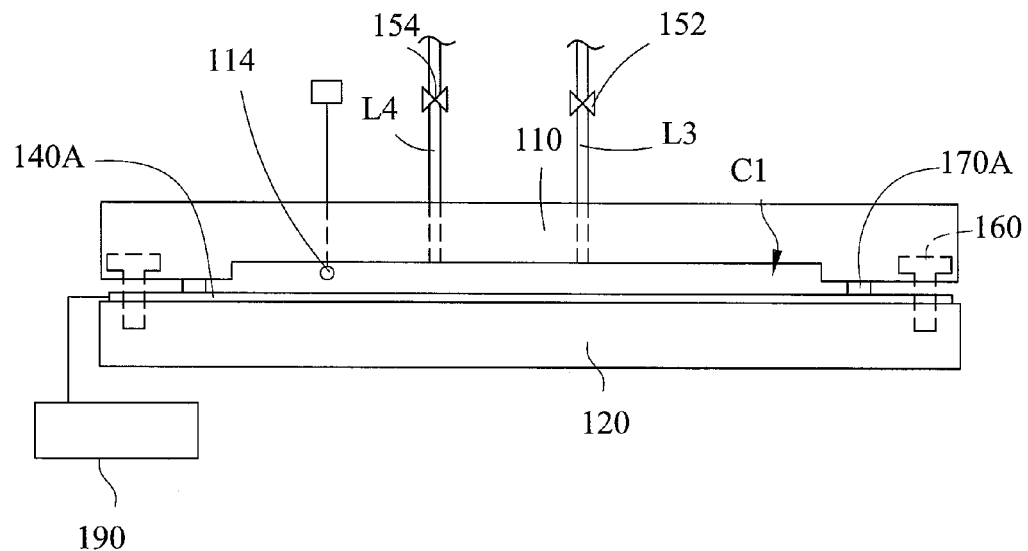
FIG. 6C and FIG. 6D respectively show side views of the second plate of the electrical property measuring apparatus of FIG. 6A.
Figure 6D:
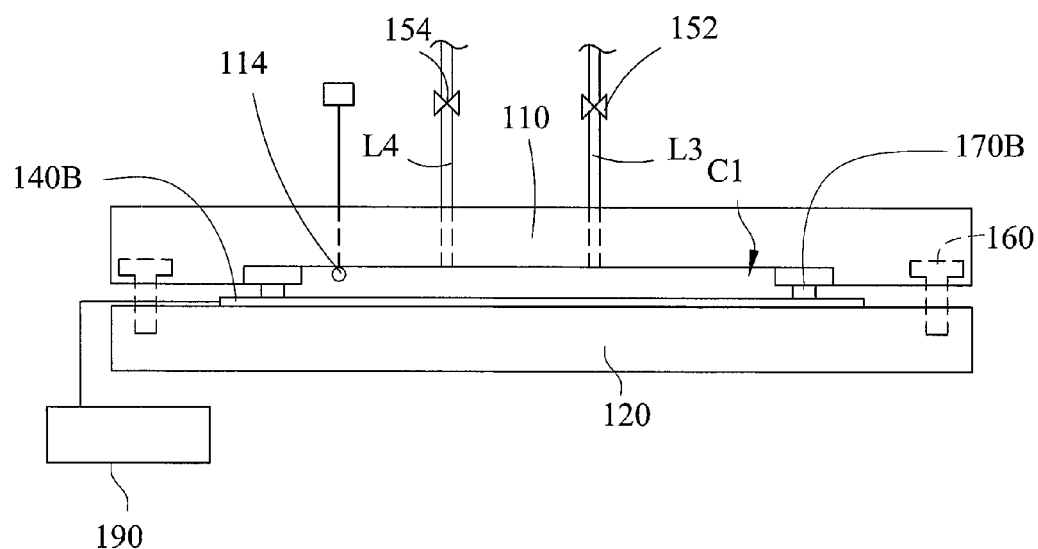

FIG. 6A is a partial schematic view of an electrical property measuring apparatus according to another embodiment of the disclosure. A portion of the second plate is described herein. FIG. 6B is a perspective view of the second plate of FIG. 6A. FIG. 6C and FIG. 6D respectively show side views of the second plate of the electrical property measuring apparatus of FIG. 6A. The electrical property measuring apparatus used to measure different area of the object is illustrated. Referring to FIG. 6A to FIG. 6D, the structures are mainly similar to the FIG. 1A, FIG. 1B, FIG. 4A and FIG. 4B, and the difference from the above mentioned embodiment is illustrated as follows: The electrical property measuring apparatus 100 of the embodiment includes a first sealing element 170A and a second sealing element 170B configured on the second plate 120 separately, wherein the first sealing element 170A surrounds the second sealing element 170B, and the first sealing element 170A and the second sealing element 170B are detachable and assembled to the second plate 120, so that the electrical property measuring apparatus 100 can be adapted to a first object 140A or a second object 140B with different areas. For example, when the electrical property of the first object 140A with a larger area is measured, as shown in FIG. 6C, the first sealing element 170A located at the outer peripheral can be used, whereas when the electrical property of the second object 140B with a smaller area is measured, the second sealing element 170B can be used, and it is unnecessary to use the first sealing element 170A. Accordingly, the applicability of the electrical property measuring apparatus 100 can be increased. In addition, the size or the shape of the first and second sealing element 170A and 170B can be adjusted according to actual requirements in order to adjust the applicability of the electrical property measuring apparatus 100.

In one embodiment of the disclosure, the first sealing element 170A can be disposed outside the space C1.

In one embodiment of the disclosure, the second sealing element 170B can be disposed inside the space C1.

Wherein the second plate 120 may or may not have to dispose recess thereon. This embodiment can also be adapted to the first plate 110.

When the first plate 110 and the second plate 120 are closed and the first plate 110 to the second plate 120 are fixed by the fastening assembly 160, a space C1 is formed by the pressed surface and the first plate 110 to the second plate 120. At the same time, the annular sealing element 170B within the space C1 presses on the object 140, so that the wires 128 are electrically connected to the object 140 and the electrical property measuring unit 190 respectively. And then, the controller 180 is operated to output a signal to open the inlet valve 152 and to close the outlet valve 154, and the pump 156 of the fluid supplying system 150 is actuated to bring the fluid in the fluid tank 158 into the space C1 through the inlet valve 152 and the third flow path L3. When the fluid pressure in the space C1 reaches a predetermined value, the fluid pressure detector 114 within the space C1 may transmit a signal to the controller 180, at this time the controller 180 closes the inlet valve 152 and the pump 156 to stop providing the fluid, and the electrical property measuring unit 190 is actuated for measuring the electrical property of the object 140. After the electrical property measuring unit 190 finishes the measurement, a signal is transmitted to the controller 180. After that, the controller 180 closes the inlet valve 152 and the pump 156 first and then opens the outlet valve 154, so that the fluid can be output to the fluid tank 158 out of the space C1 through the fourth flow path L4 and the outlet valve 154. Finally, when the fluid pressure in the space C1 is decreased to a predetermined value (e.g., equal to the pressure of the external environment), the fluid pressure detector 114 in the space C1 may send a signal to the controller 180, and then after the controller 180 closes the outlet valve 154 and the pressure within the space C1 is released, the first plate 110 can be opened and the object 140 can be taken out. And after the electrical property of the object 140 is measured, the procedures of calibrating the pressure sensor are similar to FIG. 1A and FIG. 1B, and thus it is not repeated herein.

Figure 7:
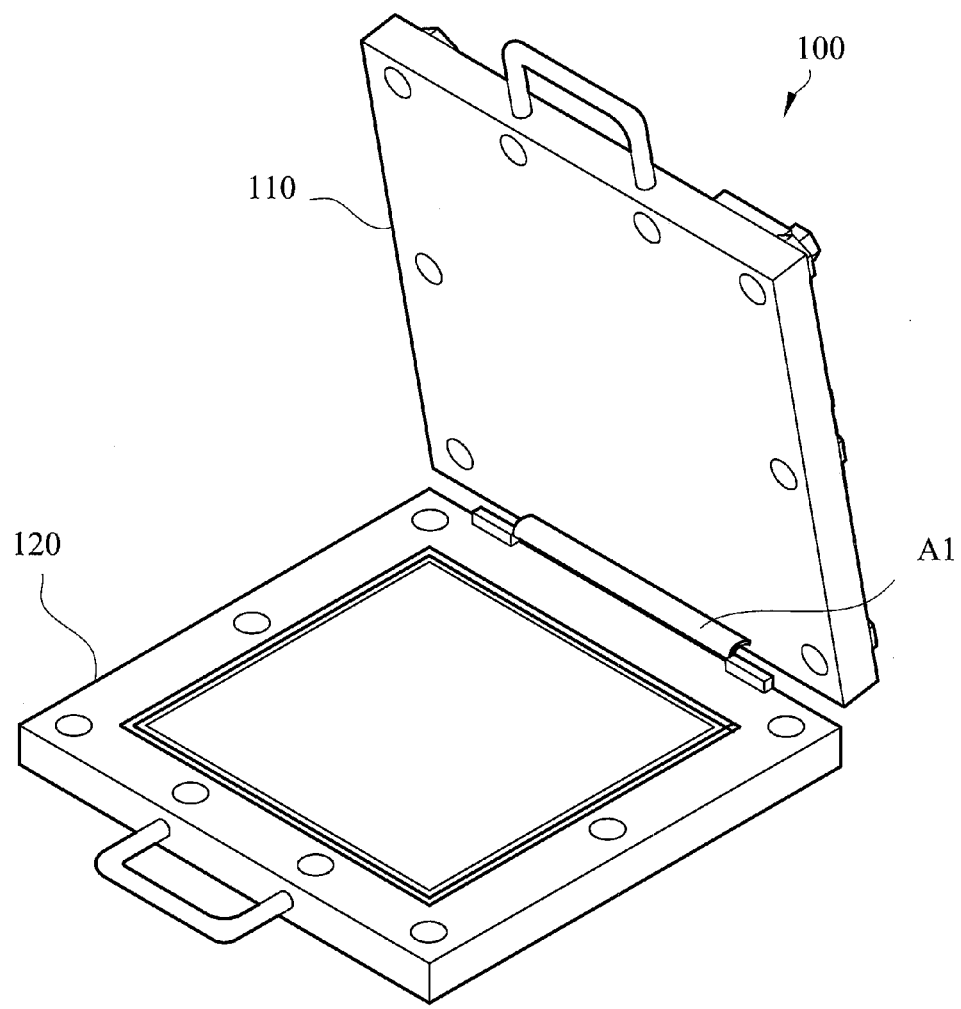
FIG. 7 is a three-dimensional schematic view of an electrical property measuring apparatus for pressure sensor of the disclosure.

FIG. 7 is a three-dimensional schematic view of an electrical property measuring apparatus for pressure sensor of the disclosure. The electrical property measuring apparatus 100 for pressure sensor of the disclosure includes the first plate 110 and the second plate 120, and the first plate 110 and the second plate 120 are pivoted by a pivoting assembly A1 at the same sides to be relatively opened or closed. When the first plate 110 and the second plate 120 are closed, the space C1 can be formed between the first plate 110 and the second plate 120. The fastening assembly 160 tightly fixes the first plate 110 and the second plate 120, so as to further ensure the pressing ability of the space C1.

In light of the foregoing, in the embodiment of the disclosure, the electrical properties of the pressure sensors are measured through the space formed by at least a portion or the whole object to be measured being disposed between the first plate and the second plate, so that the fluid can press on the object and the electrical property of the object can be measured after the fluid enters the space. And the fluid pressure within the space can be detected by the fluid pressure detector and provides the follow-up procedures of the calibration of pressure sensors.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. An electrical property measuring apparatus for pressure sensor, comprising:
   a first plate and a second plate, being opened or closed with each other;
   an object to be measured disposed between the first plate and the second plate;
   an electrical property measuring unit adapted to measure an electrical property signal of the object; and
   a fluid supplying system connected to a space formed by the first plate and a pressed surface, or a space formed by the second plate and a pressed surface, wherein the fluid supplying system provides a fluid to the space so that the fluid presses on the object and the electrical property measuring unit measures the electrical property signal of the object.

2. The electrical property measuring apparatus for pressure sensor as claimed in claim 1, further comprising a flexible element located between the first plate and the second plate, wherein the object and the fluid are separated by the flexible element.

3. The electrical property measuring apparatus for pressure sensor as claimed in claim 2, wherein the flexible element is a thin film having flexibility, elasticity and gas barrier property.

4. The electrical property measuring apparatus for pressure sensor as claimed in claim 1, further comprising a sealing element disposed between the first plate and the second plate and located at a peripheral of the space.

5. The electrical property measuring apparatus for pressure sensor as claimed in claim 4, wherein an annular trench is disposed at the peripheral of the space, and the sealing element is disposed in the annular trench.

6. The electrical property measuring apparatus for pressure sensor as claimed in claim 5, wherein the sealing element is a rubber or a polymer.

7. The electrical property measuring apparatus for pressure sensor as claimed in claim 1, wherein the second plate is a fixed supporting platform and the object is adapted to be disposed on the second plate.

8. The electrical property measuring apparatus for pressure sensor as claimed in claim 1, wherein the object is one pressure sensor or a plurality of pressure sensors.

9. The electrical property measuring apparatus for pressure sensor as claimed in claim 8, further comprising the plurality of pressure sensors formed by the plurality of pressure sensors being connected to each other and disposing on the flexible element.

10. The electrical property measuring apparatus for pressure sensor as claimed in claim 1, wherein the fluid is a gas or a liquid.

11. The electrical property measuring apparatus for pressure sensor as claimed in claim 1, wherein the fluid supplying system and the space are linked by a first piping and a second piping, an inlet valve is disposed at the first piping located at an inlet of the space, and an outlet valve is disposed at the second piping located at an outlet of the space, the fluid supplying system is controlled by a controller so that the fluid provided from the fluid supplying system enters the space through the first piping and the inlet valve and leaves the space through the second piping and the outlet valve.

12. The electrical property measuring apparatus for pressure sensor as claimed in claim 11, wherein the fluid supplying system comprises a pump and a fluid tank, or the fluid supplying system comprises a pump.

13. The electrical property measuring apparatus for pressure sensor as claimed in claim 11, wherein the first plate has one or a plurality of first flow paths and one or a plurality of second flow paths, the first flow path and the second flow path are respectively disposed at two sides of the first plate, so that the first flow path is connected to the inlet valve and the second flow path is connected to the outlet valve.

14. The electrical property measuring apparatus for pressure sensor as claimed in claim 13, wherein the flexible element is a bag disposed in the space, and the bag is connected to the first flow path and the second flow path.

15. The electrical property measuring apparatus for pressure sensor as claimed in claim 1, wherein a first recess is formed on the first plate and the second plate is a supporting platform.

16. The electrical property measuring apparatus for pressure sensor as claimed in claim 1, wherein a second recess is formed on the second plate and the first plate is a supporting platform.

17. The electrical property measuring apparatus for pressure sensor as claimed in claim 1, wherein the first plate and the second plate respectively form a corresponding first recess and second recess.

18. The electrical property measuring apparatus for pressure sensor as claimed in claim 17, wherein a supporting plate is disposed on the second recess to support the object.

19. The electrical property measuring apparatus for pressure sensor as claimed in claim 17, wherein a supporting plate is disposed on the first recess to support the object.

20. The electrical property measuring apparatus for pressure sensor as claimed in claim 1, wherein a fluid pressure detector is disposed in the space for detecting a fluid pressure variation within the space.

21. The electrical property measuring apparatus for pressure sensor as claimed in claim 1, wherein the object has a measuring area and a wiring connecting area surrounding the measuring area, and the object comprises one or a plurality of pressure sensors or a pressure sensor array electrically connected to the wire connecting area respectively, and the wire connecting area is connected to one or a plurality of wires.

22. The electrical property measuring apparatus for pressure sensor as claimed in claim 1, wherein the electrical property measuring unit is a microprocessor.

23. The electrical property measuring apparatus for pressure sensor as claimed in claim 1, wherein a first sealing element and a second sealing element are configured on the second plate, and the first sealing element surrounds the second sealing element.

24. The electrical property measuring apparatus for pressure sensor as claimed in claim 23, wherein the first sealing element and the second sealing element are detachable or assembled to the second plate.

25. The electrical property measuring apparatus for pressure sensor as claimed in claim 23, wherein a first recess is disposed on the first plate, and at least one third flow path and at least one fourth flow path are disposed in the first recess located on the first plate, the third flow path is connected to an inlet valve and the fourth flow path is connected to an outlet valve, the inlet valve and the outlet valve are respectively connected to the fluid supplying system through a first piping and a second piping.

26. The electrical property measuring apparatus for pressure sensor as claimed in claim 25, further comprising a fluid pressure detector disposed in the first recess of the first plate and located within the second sealing element.

27. The electrical property measuring apparatus for pressure sensor as claimed in claim 1, wherein a first sealing element and a second sealing element are disposed on the first plate, and the first sealing element surrounds the second sealing element.

28. The electrical property measuring apparatus for pressure sensor as claimed in claim 27, wherein the first sealing element and the second sealing element are detachable or assembled to the first plate.

29. The electrical property measuring apparatus for pressure sensor as claimed in claim 27, wherein a first recess is disposed on the first plate, so that the second sealing element is located within the first recess, and at least one third flow path and at least one fourth flow path are disposed in the first recess located on the first plate, the third flow path is connected to an inlet valve and the fourth flow path is connected to an outlet valve, the inlet valve and the outlet valve are respectively connected to the fluid supplying system through a first piping and a second piping.

30. The electrical property measuring apparatus for pressure sensor as claimed in claim 29, further comprising a fluid pressure detector disposed in the first recess of the first plate and located in the second sealing element.

31. A method of measuring electrical property for pressure sensor, comprising:
- providing a first plate and a second plate;
- providing an object to be measured disposed between the first plate and the second plate;
- closing the first plate and the second plate;
- forming a space between the first plate and a pressed surface, or forming a space between the second plate and a pressed surface;
- providing a fluid to the space through a fluid supplying system;
- detecting a fluid pressure variation within the space with a fluid pressure detector;
- pressing on the object with the fluid; and
- measuring an electrical property signal transmitted by the object due to a fluid pressure.

32. The method of measuring electrical property for pressure sensor as claimed in claim 31, further comprising:
- providing a thin film, wherein the thin film is located between the first plate and the second plate and contacts with the object so that the fluid in the space presses on the object through the thin film.

33. The method of measuring electrical property for pressure sensor as claimed in claim 31, further comprising:
- providing a bag, wherein the bag is disposed in the space, the bag is connected to the fluid supplying system and contacts with the object so that the fluid in the space presses on the object through the bag.

34. The method of measuring electrical property for pressure sensor as claimed in claim 31, wherein the object is one pressure sensor or a plurality of pressure sensors.

35. The method of measuring electrical property for pressure sensor as claimed in claim 34, further comprising:
- measuring an electrical property of one of the pressure sensors of the object, and a rest of the pressure sensors which are not measured are electrically grounded.

\* \* \* \* \*